United States Patent
Jiang et al.

(10) Patent No.: US 9,900,899 B2
(45) Date of Patent: Feb. 20, 2018

(54) DYNAMIC SPECTRUM ALLOCATION METHOD AND DYNAMIC SPECTRUM ALLOCATION DEVICE

(71) Applicant: CHINA ACADEMY OF TELECOMMUNICATIONS TECHNOLOGY, Beijing (CN)

(72) Inventors: Chenggang Jiang, Beijing (CN); Wenling Bai, Beijing (CN); Yuanyuan Li, Beijing (CN); Yu Yang, Beijing (CN); Jinling Hu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 192 days.

(21) Appl. No.: 14/780,583

(22) PCT Filed: Mar. 26, 2014

(86) PCT No.: PCT/CN2014/074074
§ 371 (c)(1),
(2) Date: Sep. 28, 2015

(87) PCT Pub. No.: WO2014/166335
PCT Pub. Date: Oct. 16, 2014

(65) Prior Publication Data
US 2016/0057765 A1    Feb. 25, 2016

(30) Foreign Application Priority Data

Apr. 7, 2013 (CN) .......................... 2013 1 0117967

(51) Int. Cl.
*H04L 12/50* (2006.01)
*H04W 72/12* (2009.01)
(Continued)

(52) U.S. Cl.
CPC ....... *H04W 72/1231* (2013.01); *H04W 16/10* (2013.01); *H04W 24/10* (2013.01)

(58) Field of Classification Search
CPC ................................................ H04W 72/0406
(Continued)

(56) References Cited

U.S. PATENT DOCUMENTS 6,018,663 A    1/2000  Karlsson et al.
6,223,041 B1   4/2001  Egner et al.
(Continued)

FOREIGN PATENT DOCUMENTS

CN   102244881 A   11/2011
CN   102612042 A    7/2012
(Continued)

OTHER PUBLICATIONS

First Office Action regarding Chinese Application No. 201310117967.3, dated Feb. 6, 2017.Translation provided by EPO.
(Continued)

*Primary Examiner* — Dang Ton
(74) *Attorney, Agent, or Firm* — Pro-TECHTOR International Services; Ian Oglesby

(57) ABSTRACT

The present disclosure provides a dynamic spectrum allocation method and a dynamic spectrum allocation device. In the method, a centralized node performs spectrum allocation and transmits a spectrum allocation result to each communication node, so that the communication node operates at a corresponding spectrum resource in accordance with the spectrum allocation result and performs statistics of communication quality measurement information. The centralized node receives the communication quality measurement information reported by the communication node, and determines whether or not it is required to trigger the spectrum re-allocation for the communication node in accordance with the communication quality measurement information about the communication node. When it is required to trigger the spectrum re-allocation, the centralized node re-allocates the spectrum for the communication node.

16 Claims, 5 Drawing Sheets

(51) Int. Cl.
*H04W 16/10* (2009.01)
*H04W 24/10* (2009.01)

(58) Field of Classification Search
USPC .......................................................... 370/329
See application file for complete search history.

(56) References Cited

U.S. PATENT DOCUMENTS

| | | | |
|---|---|---|---|
| 7,912,138 B2 * | 3/2011 | Geile | ............... G06F 17/14 370/203 |
| 2012/0115541 A1 | 5/2012 | Suga et al. | |
| 2013/0310062 A1 | 11/2013 | Liu Xing et al. | |

FOREIGN PATENT DOCUMENTS

| CN | 102624465 A | 8/2012 |
|---|---|---|
| WO | WO2012087694 A1 | 6/2012 |
| WO | WO2012169400 A1 | 12/2012 |
| WO | WO2013044830 A1 | 4/2013 |

OTHER PUBLICATIONS

International Search Report and Written Opinion of the International Searching Authority for International Application No. PCT/CN2014/074074, dated Jul. 8, 2014. Translation provided by WIPO.
EPO Supplementary Search Report and Opinion for EPO application No. 14783241.4 dated May 10, 2016.

* cited by examiner

DYNAMIC SPECTRUM ALLOCATION METHOD AND DYNAMIC SPECTRUM ALLOCATION DEVICE

CROSS-REFERENCE TO RELATED APPLICATION

The present application is the U.S. national phase of PCT Application No. PCT/CN2014/074074 filed on Mar. 26, 2014, which claims a priority of the Chinese patent application No. 201310117967.3 filed on Apr. 7, 2013, which is incorporated herein by reference in its entirety.

TECHNICAL FIELD

The present disclosure relates to the field of communication technologies, in particular to a dynamic spectrum allocation method and a dynamic spectrum allocation device.

BACKGROUND

Along with the rapid development of mobile communication industry, the contradiction between an increasing demand of the broadband wireless communication and limit spectrum resources become more and more obvious. On one hand, although such techniques as Orthogonal Frequency Division Multiplexing (OFDM) and Multiple-Input Multiple-Output (MIMO) have been adopted by a Long Term Evolution (LTE) system so as to improve a spectrum utilization rate, these techniques are not fundamental solutions to the shortage of spectrum resources. In addition, along with the rapid development of mobile communication services, telecom operators are being confronted with a more serious situation of spectrum resource shortage. On the other hand, the frequency spectra of some radio communication systems are used rarely in some time periods and at some regions. For example, for radio and television bands, due to the replacement of analogue transmission with digital transmission where the transmission capacity can be improved remarkably, the bands of many radio and television systems are in a vacant state for a long period of time, resulting in the waste of the valuable radio resources. Furthermore, it is also found that the frequency spectra of some other radio communication systems are not utilized fully.

In order to overcome the shortage of the spectrum resources, a Cognitive Radio (CR) technology has attracted more and more attention. In the CR technique, a smart radio communication system may acquire a vacant band available at a current position through a spectrum sensing technique, and use the vacant band opportunistically, so as to improve the spectrum utilization rate and alleviate the shortage of the spectrum resources. As to an existing spectrum sensing technique, an external environment may be sensed by an artificial intelligence system, and some operating parameters, such as transmission power, a carrier frequency and a modulation technique, may be modified in real time, so as to enable an internal state of the communication system to be adapted to a change in the statistical characteristics of a received radio signal, thereby to achieve the reliable communication at any time and any location, and effectively utilize the spectrum resources.

The entire cognition procedure is completed by the CR technique through a cognition cycle. As shown in FIG. 1, the entire cognition procedure includes three steps, i.e., a spectrum sensing step, a spectrum analysis step and a spectrum decision step. At the spectrum sensing step, a vacant spectrum may be detected by analyzing an inputted radio frequency (RF) stimulating signal. Whether or not the spectrum is being occupied may be determined by detecting whether or not a signal exists at a certain band using a certain signal detection algorithm, e.g., an energy detection algorithm or a matched filtering detection algorithm, so as to detect the vacant spectrum. At the spectrum analysis step, channel state information and channel capacity may be estimated in accordance with a result obtained from the spectrum sensing step and the analysis on the other ratio signals. At the spectrum decision step, a final spectrum usage decision may be acquired in accordance with the vacant spectrum resources obtained at the spectrum sensing step and a result obtained from the spectrum analysis step. This decision may include frequency point, i.e., a decision on spectrum allocation, bandwidth, transmission power, and modulation mode.

Due to the limited vacant spectrum resources, it is required to allocate the vacant frequency spectra for a plurality of communication nodes appropriately. In the related art, the vacant frequency spectra may be allocated using an intersystem spectrum allocation method and an intercell spectrum allocation method.

For the intersystem spectrum allocation method, there is interference between cells of different radio communication systems when these systems are in an operating state, so the frequency spectra may be allocated uniformly among the various radio communication systems so as to eliminate the intersystem/intercell interference.

For the intercell spectrum allocation method, the radio communication system is of a cellular structure, and a large region is covered by a plurality of cells, so as to achieve continuous coverage and unlimited communication. There is also interference among a plurality of cells of an identical radio communication system. Taking the macrocell communication as an example, there is the interference between the adjacent macrocells, and especially the communication of a user at an edge of a cell may be interfered with a user or a base station in an adjacent cell. Based on this, the intercell interference may be suppressed mainly by network planning, i.e., by setting appropriate parameters for cell radius, cell coverage and cell switching.

It is found by the inventor that there are at least the following defects in the prior art. For the intersystem spectrum allocation method as a static one, the spectra are allocated for radio services/systems in accordance with their demands, and the spectrum utilization rate thereof is relatively small. For the intercell spectrum allocation method, as also a static one, it is required to re-plan the network and adjust the parameters rigorously so as to adjust the spectrum resources for the cells in the network, so it will take a long period of time. Furthermore, the CR system is a system where the spectrum resources are used dynamically, and obviously, such static spectrum allocation method as the intersystem spectrum allocation method and the intercell spectrum allocation method cannot be adapted to the CR system.

SUMMARY

An object of the present disclosure is to provide a dynamic spectrum allocation method and a dynamic spectrum allocation device, so as to allocate spectra in a CR system dynamically, and improve a spectrum allocation result.

In one aspect, the present disclosure provides in one embodiment a dynamic spectrum allocation method, including steps of: allocating, by a centralized node, a spectrum, and transmitting a spectrum allocation result to each communication node, so that the communication node operates on a spectrum resource corresponding to the communication node in accordance with the spectrum allocation result and performs statistics of communication quality measurement information; receiving, by the centralized node, the communication quality measurement information reported by each communication node; and determining, by the centralized node, whether or not it is required to trigger the spectrum re-allocation for each communication node in accordance with the communication quality measurement information about the communication node, and when it is required to trigger the spectrum re-allocation for the communication node, re-allocating the spectrum for the communication node.

In another aspect, the present disclosure provides in one embodiment a dynamic spectrum allocation method, including steps of: determining, by a communication node, a spectrum allocation result so that the communication node works on a spectrum resource corresponding to the communication node in accordance with the spectrum allocation result; performing, by the communication node, statistics of communication quality measurement information about the communication node; and transmitting, by the communication node, the communication quality measurement information to a centralized node so that the centralized node determines whether or not it is required to trigger the spectrum re-allocation in accordance with the communication quality measurement information about the communication node.

In yet another aspect, the present disclosure provides in one embodiment a centralized node, including: a transmission module configured to allocate a spectrum, and transmit a spectrum allocation result to each communication node, so that the communication node operates on a spectrum resource corresponding to the communication node in accordance with the spectrum allocation result and performs statistics of communication quality measurement information about the communication node; a reception module configured to receive the communication quality measurement information reported by the communication node; a judgment module configured to judge whether or not it is required to trigger the spectrum re-allocation for the communication node in accordance with the communication quality measurement information about the communication node; and an allocation module configured to re-allocate the spectrum for the communication node when the judgment module judges that it is required to trigger the spectrum re-allocation for the communication node.

In still yet another aspect, the present disclosure provides in one embodiment a communication node, including: a determination module configured to determine a spectrum allocation result so that the communication node operates on a corresponding spectrum resource in accordance with the spectrum allocation result; a statistics module configured to perform statistics of communication quality measurement information about the communication node; and a transmission module configured to transmit the communication quality measurement information to a centralized node so that the centralized node determines whether or not it is required to trigger the spectrum re-allocation in accordance with the communication quality measurement information about the communication node.

According to the embodiments of the present disclosure, for a CR system, the centralized node may perform the dynamic spectrum allocation in accordance with the communication quality measurement information, and trigger the spectrum re-allocation in accordance with the counted communication quality measurement information about the communication node itself. The spectrum re-allocation may be performed periodically, so it is able to prevent the system performance from being degraded for a long period of time due to an error caused by the single spectrum allocation and due to model and analysis errors caused when merely static/priori information is used, thereby to improve the spectrum allocation result.

BRIEF DESCRIPTION OF THE DRAWINGS

In order to illustrate the present disclosure in a more apparent manner, the drawings desired for the present disclosure will be described hereinafter briefly. Obviously, the following drawings merely relate to a part of the embodiments of the present disclosure, and based on these drawings, a person skilled in the art may obtain the other drawings without any creative effort.

DETAILED DESCRIPTION

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

Figure 1:
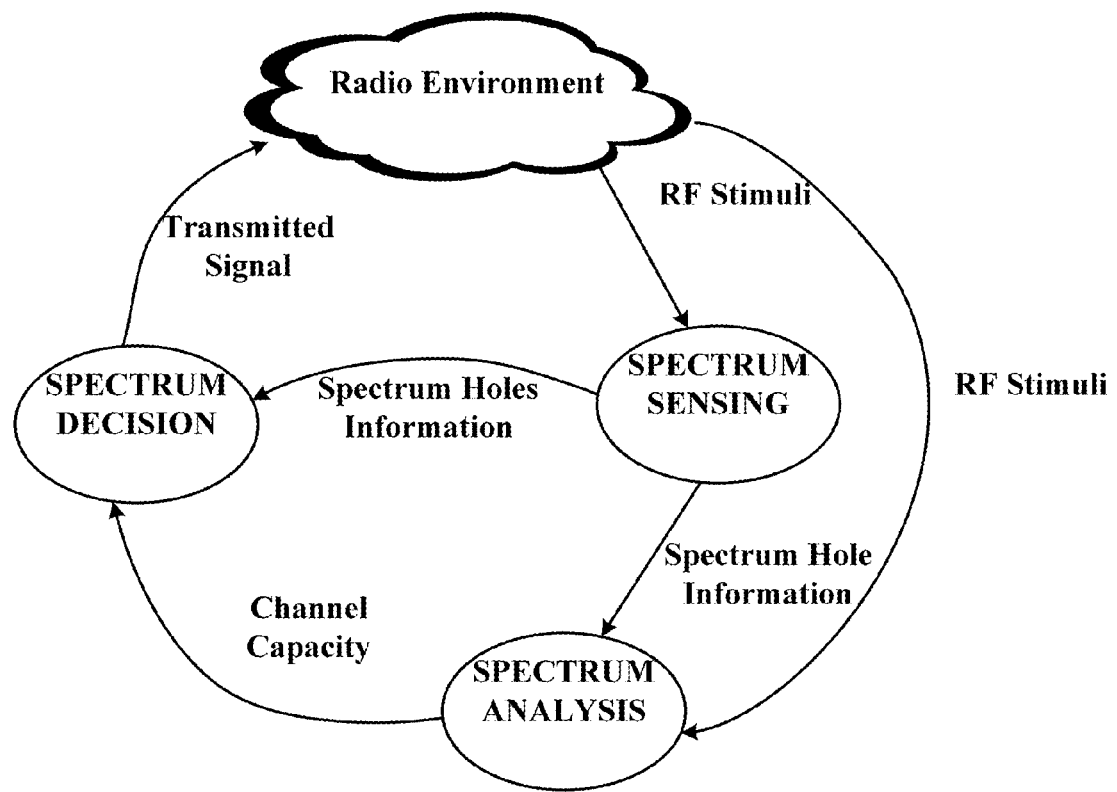
FIG. 1 is a schematic view showing a cognition procedure completed by an existing CR system through a cognitive cycle.
Figure 2:
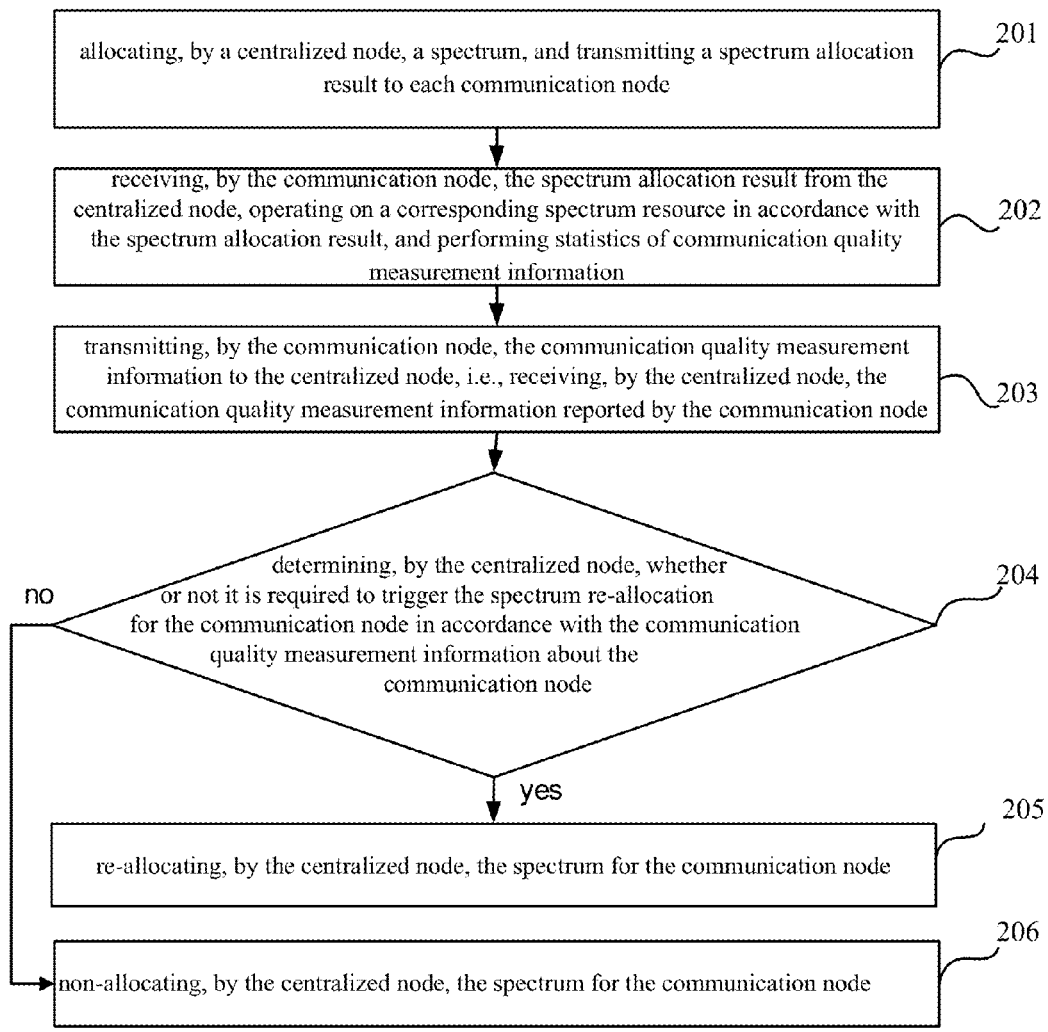
FIG. 2 is a flow chart of a dynamic spectrum allocation method according to one embodiment of the present disclosure.

The present disclosure provides in one embodiment a dynamic spectrum allocation method for use in a CR system, so as to dynamically allocate a spectrum in accordance with communication quality measurement information. As shown in FIG. 2, the dynamic spectrum allocation method may include the following steps.

Step 201: allocating, by a centralized node, a spectrum, and transmitting a spectrum allocation result to each communication node.

In the embodiments of the present disclosure, subsequent to the establishment of a network, the centralized node may perform initial spectrum allocation. The centralized node may allocate vacant spectrum resources for each communication node in the network, and transmit the spectrum allocation result to the communication node. The spectrum allocation result includes information about the spectrum resources desired for the operation of the communication node. The communication node in the network includes, but not limited to, a macro base station or a micro base station.

Step 202: receiving, by the communication node, the spectrum allocation result from the centralized node, operating on a corresponding spectrum resource in accordance with the spectrum allocation result, and counting communication quality measurement information.

In the embodiments of the present disclosure, after receiving the spectrum allocation result from the centralized node, the communication node may acquire the spectrum resource allocated for it, and start to work on the spectrum resource. In addition, the communication node may count its communication quality measurement information, which includes measurement information capable of representing the communication link quality of the communication node itself.

In the embodiments of the present disclosure, the communication quality measurement information includes, but not limited to, one of the average throughput per resource unit counted by the communication node within a time period, a block error rate (BLER) for all users counted by the communication node within the time period, an average interference measurement value counted by the communication node within the time period, and other measurement information counted by the communication node and capable of representing the communication link quality, or a combination thereof.

When the average throughput per resource unit is counted by the communication node within the time period, the downlink or uplink throughput may be counted. For downlinks, the average throughput per resource unit is equal to the throughput for all the downlinks divided by the number of occupied physical resources, i.e., the average throughput per resource unit=the throughput for all the downlinks/the number of occupied physical resources. For uplinks, the average throughput per resource unit is equal to the throughput for all the uplinks divided by the number of the occupied physical resources, i.e., the average throughput per resource unit=the throughput for all the uplinks/the number of the occupied physical resources. For a system with an orthogonal frequency division multiplexing (OFDM) mode, the number of the occupied physical resources is just the number of the occupied sub-carriers, while for a system using a Code Division Multiple Access (CDMA) mode, the number of the occupied physical resources is just the number of the occupied code channels.

When the BLER for all the users is counted by the communication node within the time period, a downlink or uplink BLER may be counted. For the uplinks, the BLER for all the users is an error probability for blocks transmitted by all the users within a time window. For the downlinks, the BLER may be calculated equivalently in accordance with the number of Negative Acknowledgements (NACKs) and Acknowledgements (ACKs) fed back from the users, and the BLER for all the users is equal to the number of the NACKs for all the downlinks divided by a sum of the number of the ACKs for all the downlinks and the number of the NACKs for all the downlinks, i.e., the BLER for all the users=the number of the NACKs for all the downlinks/(the number of the ACKs for all the downlinks+the number of the NACKs for all the downlinks).

When the average interference measurement value may be counted by the communication node within the time period, for a system with a Time Division-Synchronous Code Division Multiple Access (TD-SCDMA) mode, the average interference measurement value may be an average value of Interference Signal Code Power (ISCP), while for a system with a Time Division-Long Term Evolution (TD-LTE) mode, the average interference measurement value may be an average value of 1/RSRQ which is an abbreviation of Reference Signal Received Quality.

Step 203: transmitting, by the communication node, the communication quality measurement information to the centralized node, i.e., receiving, by the centralized node, the communication quality measurement information reported by the communication node.

Step 204: determining, by the centralized node, whether or not it is required to trigger the spectrum re-allocation for the communication node in accordance with the communication quality measurement information about the communication node, and when it is required to trigger the spectrum re-allocation, proceeding to Step 205, and otherwise, proceeding to Step 206.

In the embodiments of the present disclosure, when the centralized node determines whether or not it is required to trigger the spectrum re-allocation for the communication node in accordance with the communication quality measurement information, it may determine whether or not the communication quality measurement information exceeds a predetermined quality threshold. When the communication quality measurement information does not exceed the predetermined quality threshold, the centralized node may determine that it is required to trigger the spectrum re-allocation, and when the communication quality measurement information exceeds the predetermined quality threshold, the centralized node determines that it is unnecessary to trigger the spectrum re-allocation.

In the embodiments of the present disclosure, when the centralized node determines whether or not it is required to trigger the spectrum re-allocation for the communication node in accordance with the communication quality measurement information about the communication node and there are M pieces of communication quality measurement information about the communication node, the centralized node may determine a decision result representing the communication quality with respect to each piece of communication quality measurement information. When $$\frac{1}{M} * \sum_{m=1}^{M} (W_m * Q_m)$$

is greater than a first predetermined threshold, the centralized node may determine that it is required to trigger the spectrum re-allocation, and otherwise, it may determine that it is unnecessary to trigger the spectrum re-allocation. $Q_1$, $Q_2$, ..., $Q_M$ represent the decision results corresponding to the pieces of communication quality measurement information, respectively, and Wm represents a weighted value for Qm and has a value configured in accordance with the network requirements.

Specifically, the communication quality measurement information may include the average throughput per resource unit counted by the communication node within the time period, the BLER for all users counted by the communication node within the time period, and the average interference measurement value counted by the communication node within the time period. At this time, when the average throughput per resource unit within the time period is less than a second predetermined threshold, the corresponding decision result is a first mark (e.g., $Q_1=1$) for representing the bad communication quality, otherwise, the corresponding decision result is a second mark (e.g., $Q_1=0$)

for representing the good communication quality. When the BLER for all the users within the time period is greater than a third predetermined threshold, the corresponding decision result is the first mark (e.g., $Q_2=1$) for representing the bad communication quality, and otherwise, the corresponding decision result is the second mark (e.g., $Q_2=0$) for representing the good communication quality. When the average interference measurement value within the time period is greater than a fourth predetermined threshold, the corresponding decision result is the first mark (e.g., $Q_3=1$) for representing the bad communication quality, and otherwise, the corresponding decision result is the second mark (e.g., $Q_3=0$) for representing the good communication quality.

When $1/3 * \Sigma_{m=1}^{3}(W_m * Q_m)$ is greater than the first predetermined threshold, the centralized node may determine that it is required to trigger the spectrum re-allocation for the communication node, and otherwise, the centralized node may determine that it is unnecessary to trigger the spectrum re-allocation. Wm represents a weighted value for Qm and has a value configured in accordance with the network requirements.

It should be appreciated that, the thresholds may be selected in accordance with the communication quality measurement information and configured when initializing the network.

In addition, for a Frequency Division Duplexing (FDD) system, whether or not it is required to trigger the re-allocation of the spectrum to be occupied by the uplink may be determined in accordance with the decision result of the communication quality measurement information about the uplink, and whether or not it is required to trigger the re-allocation of the spectrum to be occupied by the downlink may be determined in accordance with the decision result of the communication quality measurement information about the downlink.

For a Time Division Duplexing (TDD) system, whether or not it is required to perform the re-allocation of the spectrum occupied by a cell may be determined in accordance with the decision result of the communication quality measurement information about the uplink or downlink.

Step 205: re-allocating, by the centralized node, the spectrum for the communication node.

Step 206: non-allocating, by the centralized node, the spectrum for the communication node.

In the embodiments of the present disclosure, the spectrum for the communication node may be re-allocated by the centralized node as follows by taking a communication node 1 as an example. The centralized node may determine interferences factor between cells, to which the communication nodes belong, in accordance with the spectrum allocation result. Next, the centralized node may determine, in accordance with the interference factors, communication nodes (e.g., communication node 2 as mentioned hereinafter) corresponding to one or more cells, interference factors between which and the cell the communication node 1 belongs to are greater than a predetermined interference threshold. Then, the centralized node may re-allocate the spectra for the communication node 1 and the communication nodes 2.

In one embodiment, the centralized node is required to re-allocate the spectra for the communication node 1 and the communication node 2, and transmit the re-allocation result to the communication node 1 and the communication node 2. When re-allocating the spectra for the communication node 1 and the communication node 2, the centralized node may allocate the vacant spectra available in regions where the communication node 1 and the communication node 2 are located for the communication node 1 and the communication node 2, and an identical spectrum, or identical and adjacent spectra, may not be allocated for the communication node 1 and the communication node 2. Further, the communication node 1 and the communication node 2 are required to adjust their own operating frequency points in accordance with the re-allocated spectra.

In the embodiments of the present disclosure, the centralized node may determine, in accordance with the spectrum allocation result, the interference factors between the cells to which the communication nodes belong on the basis of, but not limited to, a combination of spectrum allocation, positions (i.e., topological structures), position heights, radio environments, transmission power, system types and out-of-band radiation templates of the communication nodes, or a combination of parts of them.

The interference factor is a function of such parameters of the communication node as the positions, position heights, radio environments, transmission power, system types, and out-of-band radiation templates. In addition, for a cell to which a communication node A belongs, the interference factors may include an interference factor between the cell to which the communication node A belongs and a cell to which a communication node B belongs, an interference factor between the cell to which the communication node A belongs and a cell to which a communication node C belongs, and an interference factor between the cell to which the communication node A belongs and a cell to which a communication node D belongs, and so on.

For different functions, different calculation modes are used to calculate the interference factors, and two calculation modes are given in the embodiments of the present disclosure. In a first mode, the interference may be evaluated in accordance with an average carrier-to-interference ratio degradation level of a user equipment (UE), e.g., the average carrier-to-interference ratio degradation level of the UE may be determined as the interference factor between a cell to which an interference source communication node belongs and a cell to which a target communication node belongs. In a second mode, the interference may be evaluated in accordance with average signal power of the UE in the cell, to which the interference source communication node belongs, received by a base station equipment to which the target communication node belongs, e.g., the average signal power of the UE in the cell to which the interference source communication node belongs may be determined as the interference factor between the cell to which the interference source communication node belongs and the cell to which the target communication node belongs. These two modes will be described hereinafter in details.

In the first mode, the interference factor between the cells to which the communication nodes belong may be determined by the centralized node through the following steps.

At first, the centralized node may calculate signal power of a cell, to which the target communication node belongs, received by the UE in the cell using the following formula: $P_{received-1}=p_1+G_{1i}-PL_{1i}$, wherein $p_1$ represents transmission power of the target communication node, $G_{1i}$ represents an antenna gain of the target communication node and a UE i, and $PL_{1i}$ represents a path loss between a base station equipment of the target communication node and the UE i in the cell to which the target communication node belongs. The path loss is determined in accordance with the spectrum allocation, the positions, the position heights and the radio environments. During the evaluation, the UE i may be determined in accordance with types of the cell to which the target communication node belongs and the cell to which the interference source communication node belongs.

To be specific, the path loss may be obtained by looking up a table, which is configured when initializing the network, in accordance with frequencies (depending on the spectrum allocation), a relative distance (depending on the position), a height (depending on the position height) of receiving and transmitting nodes and a radio environment at a position where the cell is located (depending on the radio environment).

Then, the centralized node may calculate power of an interference signal of a cell, to which the interference source communication node belongs, received by the UE in the cell to which the target communication node belongs using the following formula: $I_{received-i} = p_2 + G_{2i} - PL_{2i} - ACLR_{2i}$, wherein $p_2$ represents the transmission power (in dBm) of the interference source communication node, $G_{2i}$ represents an antenna gain (in dB) of the interference source communication node and the UE i, $PL_{2i}$ represents the path loss (in dB) between the base station equipment of the interference source communication node and the UE i in the cell to which the interference source communication node belongs, and $ACLR_{2i}$ represents an adjacent channel leakage ratio and it is determined in accordance with the out-of-band radiation template as well as an operating frequency interval between the cell to which the target communication node belongs and the cell to which the interference source communication node belongs.

To be specific, the path loss may be obtained by looking up a table, which is configured when initializing the network, in accordance with frequencies (depending on the spectrum allocation), a relative distance (depending on the position), a height (depending on the position height) of receiving and transmitting nodes and a radio environment at a position where the cell is located (depending on the radio environment). The adjacent channel leakage ratio may be obtained in accordance with the radiation template (depending on the out-of-band radiation template), and the operating frequency interval between the cell to which the target communication node belongs and the cell to which the interference source communication code belongs. During the evaluation, the UE i may be selected in accordance with the types of the cell to which the target communication node belongs and the cell to which the interfere source communication node (depending on the system types).

Finally, the centralized node may calculate the average carrier-to-interference ratio degradation level of the UE using the following formula and determine the average carrier-to-interference ratio degradation level as the interference factor between the cell to which the interference source communication node belongs and the cell to which the target communication node belongs:

$$CINR_{degradation} = \frac{1}{K}\sum_{i=1}^{K}\left(\frac{10^{\frac{P_{received-i}}{10}}}{N_0} - \frac{10^{\frac{P_{received-i}}{10}}}{N_0 + 10^{\frac{I_{received-i}}{10}}}\right),$$

wherein $N_0$ represents thermal noise power, and the UE i ($i=1, \ldots, K$) and the number K of the UEs are determined in accordance with the types of the cell to which the target communication node belongs and the cell to which the interference source communication node belongs.

In the second mode, the centralized node may determine the interference factor between the cells to which the communication nodes belong through the following steps.

At first, the centralized node may calculate power of a signal transmitted from an $i^{th}$ UE in the cell to which the interference source communication node belongs to the base station equipment in the cell to which the target communication node belongs using the following formula: $I_{received-i} = p_{2i} + G_{2i} - PL_{2i} - ACLR_{2i}$, wherein $p_2$ represents transmission power of the $i^{th}$ UE in the cell to which the interference source communication node belongs, $G_{2i}$ represents an antenna gain of the $i^{th}$ UE in the cell to which the interference source communication node belongs and the base station equipment in the cell to which the target communication node belongs, $PL_{2i}$ represents a path loss between the $i^{th}$ UE in the cell to which the interference source communication node belongs and the base station equipment in the cell to which the target communication node belongs and it is determined in accordance with the spectrum allocation, the positions, the position heights and the radio environments, and $ACLR_{2i}$ represents an adjacent channel leakage ratio and it is determined in accordance with the out-of-band radiation template and the operating frequency interval between the cell to which the target communication node belongs and the cell to which the interference source communication node belongs. In addition, during the evaluation, the UE i may be selected in accordance with the types of the cell to which the target communication node belongs and the cell to which the interference source communication node belongs (i.e., the system types).

To be specific, the path loss may be obtained by looking up a table, which is configured when initializing the network, in accordance with frequencies (depending on the spectrum allocation), a relative distance (depending on the position), a height (depending on the position height) of receiving and transmitting nodes and a radio environment at a position where the cell is located (depending on the radio environment). In addition, the adjacent channel leakage ratio may be obtained in accordance with the radiation template (depending on the out-of-band radiation template), and the operating frequency interval between the cell to which the target communication node belongs and the cell to which the interference source communication code belongs.

Then, the centralized node may calculate the average signal power of the UE in the cell, to which the interference source communication node belongs, received by the base station equipment in the cell to which the target communication node belongs using the following formula, and determine the average signal power as the interference factor between the cell to which the interference source communication node belongs and the cell to which the target communication node belongs:

$$I = \frac{1}{K}\sum_{i=1}^{K}\left(10^{\frac{I_{received-i}}{10}}\right),$$

wherein the UE i ($i=1, \ldots, K$) and the number K of the UEs are determined in accordance with the types of the cell to which the target communication node belongs and the cell to which the interference source communication node belongs.

According to the embodiments of the present disclosure, for the CR system, the centralized node calculates the interference factors between the communication nodes in accordance with the initialized spectrum allocation result, the communication nodes count the communication quality measurement information after the communication nodes operate at the initially-allocated spectrum, and then the centralized node determines whether or not it is required to trigger the spectrum re-allocation in accordance with the communication quality measurement information. When the spectrum re-allocation is triggered for a certain communication node, the centralized node re-allocates the spectrum for the communication node and a communication node, the interference factor between which and the communication node is relatively large, so as to achieve the dynamic spectrum allocation. The above spectrum re-allocation procedure may be performed repeatedly, until the requirements of the communication nodes in the network are met. As a result, it is able to prevent the system performance from being degraded for a long period of time due to an error caused by the single spectrum allocation and due to model and analysis errors caused when merely static/priori information is used. In addition, the above method may be used in combination with the other dynamic spectrum allocation method so as to improve the spectrum allocation result.

The present disclosure will be described hereinafter in conjunction with a specific application scenario.

Figure 3:
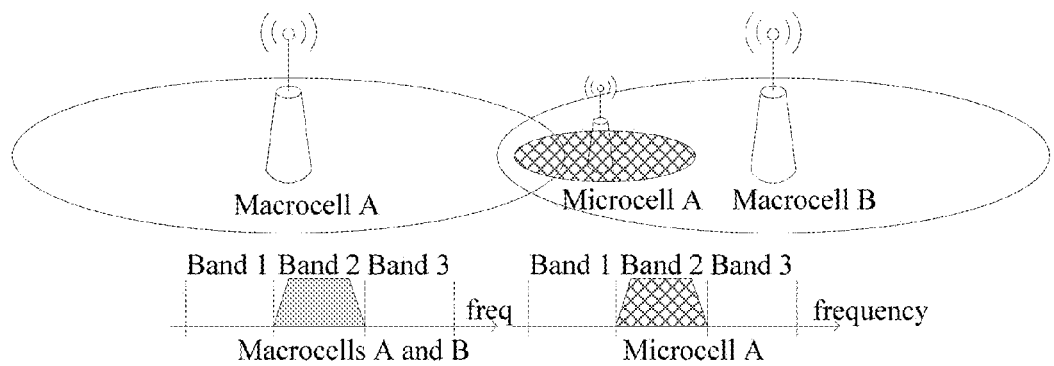
FIG. 3 is a schematic view showing an application scenario according to one embodiment of the present disclosure.

The present disclosure provides in one embodiment a dynamic spectrum allocation method. FIG. 3 is a schematic view showing an application scenario for the method. In this scenario, there are TD-LTE macro base stations and TD-LTE micro base stations each having a CR function at a certain region. A cell of a TD-LTE micro base station A is referred to as a microcell A, a cell of a TD-LTE macro base station A is referred to as a macrocell A, a cell in a TD-LTE base station B is referred to as a macrocell B, and the microcell A is located at a position adjacent to edges of the coverage regions of the TD-LTE macrocell A and the TD-LTE macrocell B. After the macrocell A, the macrocell B and the microcell A start to operate, the radio environment is cognized, and after the initial spectrum allocation, the same spectrum resources are allocated for the macrocell A, macrocell B and microcell A at this region, as shown in FIG. 3.

For the macrocell A and the macrocell B, there is relatively small interference between each of them and a corresponding cell because measures are taken when planning the network so as to reduce the intercell interference. However, the microcell A and the macrocell A operate at an identical frequency and are located at an identical region, so there is relatively large interference between them, especially between a cell corresponding to the macrocell A and a cell corresponding to the microcell A.

A solution for reducing the mutual interference between the cell corresponding to the microcell A and the cell corresponding to the macrocell A is given in the embodiments of the present disclosure, and it includes the following steps.

(1). After the network is initialized, configuring relevant parameters of each cell in the network for a device for performing the spectrum allocation, e.g., the centralized node. These relevant parameters include types, positions, heights, transmission power and antenna gains of the base stations, as well as information such as radio environments of the base stations (e.g., whether or not the base stations are located at an urban area or a suburban area) and an out-of-band radiation template.

(2). Performing, by the centralized node, the initial spectrum allocation, and sending the spectrum allocation result to the base stations. After the initial spectrum allocation, the base stations start to operate at the initially-allocated frequencies.

(3). Evaluating, by the centralized node, the interference between the cells in accordance with spectrum allocated for each cell and the above parameters, so as to obtain the interference factors, e.g., an interference factor between the macrocell A and the microcell A, an interference factor between the macrocell B and the microcell A, and an interference factor between the other cell and the microcell A. In an alternative embodiment, the interference factor between the macrocell A and the microcell A may be $I=f(f_1, f_2, p_1, p_2, h_1, h_2, P_1, P_2, Type_1, Type_2, Environ)$, wherein $f_1$ represents an operating frequency point of the microcell A, $f_2$ represents an operating frequency point of the macrocell A, $p_1$ represents a position of the micro base station A, $p_2$ represents a position of the macro base station A, $h_1$ represents a height of the micro base station A, $h_2$ represents a height of the macro base station A, $P_1$ represents transmission power of the micro base station A, $P_2$ represents transmission power of the macro base station A, $Type_1$ represents a type of the microcell A, $Type_2$ represents a type of the macrocell A, and Environ represents radio environments of the microcell A and the macrocell A, e.g., an urban area or a suburban area.

(4). After the microcell A operates at the initially-allocated band, counting the communication quality measurement information about the microcell A within a time period. To be specific, the communication quality measurement information may be counted as follows.

(a). Counting average throughput per resource unit within a time window. To be specific, the average throughput per resource unit=the throughput for all the downlinks/the number of the occupied physical resources, or the average throughput per resource unit=the throughput for all the uplinks/the number of the occupied physical resources. The number of the occupied physical resources includes the number of OFDM subcarriers and the number of CDMA code channels. For example, where 120 OFDM subcarriers are occupied by two users within a certain time window, the total throughput of the two users may be counted within this time window, and then the total throughput is divided by 120 so as to obtain the average throughput per resource unit. In addition, the average throughput per resource unit for merely parts of the users (e.g., users at an edge of a cell) may be counted, and the counting method is similar to that mentioned hereinbefore.

(b). Counting a BLER for all the users within a time window. To be specific, the BLER=the number of the NACKs for all the downlinks/(the number of the ACKs for all the downlinks+the number of the NACKs for all the downlinks), or the BLER=an error probability for blocks transmitted by all the uplink users. In addition, the BLER for merely parts of the users (e.g., the users at the edge of the cell) may also be counted.

(c). Counting an uplink interference level at a base station side within a time window. To be specific, the interference level is equal to an average value of 1/RSCQ for the uplinks within the time window. Identically, the above counting procedure may be performed by the other base stations at this region.

(5). Reporting, by the base stations, the counting result (i.e., the communication quality measurement information) to the centralized node (i.e., processing nodes at an upper layer in the network) periodically.

(6). Receiving, by the centralized node, the communication quality measurement information reported by each base station, and comparing the reported communication quality measurement information with a predetermined threshold. For example, the average throughput per resource unit reported by a base station may be compared with a threshold 1, and when the average throughput per resource unit is greater than the threshold 1, a comparison result "true" may be returned, The NACK probability reported by a base station may be compared with a threshold 2, and when the reported NACK probability is greater than the threshold 2, a comparison result "true" may be returned. The uplink interference level reported by a base station may be compared with a threshold 3, and when the reported uplink interference level is greater than the threshold 3, a comparison result "true" may be returned.

(7). Determining, by the centralized node, whether or not it is required to trigger the spectrum re-allocation at a certain region in accordance with the above comparison result. To be specific, when continuous comparison results "true" are reported by the microcell A, the spectrum re-allocation for the microcell A may be triggered.

(8). When it is required to trigger the spectrum re-allocation, searching, by the centralized node, the other cell, the interference factor between which and the microcell A is the biggest. In this embodiment, the interference factor between the macrocell A and the microcell A is the biggest.

(9). Re-allocating, by the centralized node, different spectrum resources for the microcell A and the macrocell A. For example, After the spectrum re-allocation, the microcell A may operate at band-1 in FIG. 3, while the macrocells A and B may still operate at band-2.

(10). Adjusting the operating frequency points of the microcell A and the macrocell A in accordance with the spectrum re-allocation result.

(11). Re-evaluating the interference factors between the cells in accordance with the spectrum re-allocation result and the parameters of the cells, i.e., returning to the above steps (3)-(11).

In the embodiments of the present disclosure, the spectrum allocation and re-allocation procedures are performed, until there is no large interference factor between the cells in the network and the spectrum re-allocation procedure is not triggered for the cells.

According to the embodiments of the present disclosure, through the above-mentioned spectrum allocation and re-allocation procedures, it is able to suppress the intercell interference in time and improve the network communication quality in the case that the spectrum is used dynamically by the cells in the network.

The present disclosure further provides in one embodiment a dynamic spectrum allocation method. In this embodiment, when one base station includes a plurality of cells, e.g., three sectors, or each cell includes a plurality of carriers, the spectrum allocation and re-allocation procedures may be performed by each sector and each carrier independently.

In the embodiments of the present disclosure, when calculating the interference factors, an interference factor for each sector or carrier, e.g., an interference factor between a carrier 1 of a base station 1 ad a carrier 3 of a base station 2, may be calculated. When counting the communication quality measurement information, the communication quality measurement information may be counted in sector or carrier, respectively. Further, whether or not it is required to trigger the spectrum re-allocation for each sector or carrier needs to be determined in accordance with the communication quality measurement information about each sector or carrier. Furthermore, during the spectrum re-allocation, a vacant spectrum available at a region where the cells or carriers whose operating frequency points need to be adjusted may be allocated for the corresponding cells or carriers, and an identical spectrum, or identical and adjacent spectra, may not be allocated for the corresponding cells or carriers.

Figure 4:
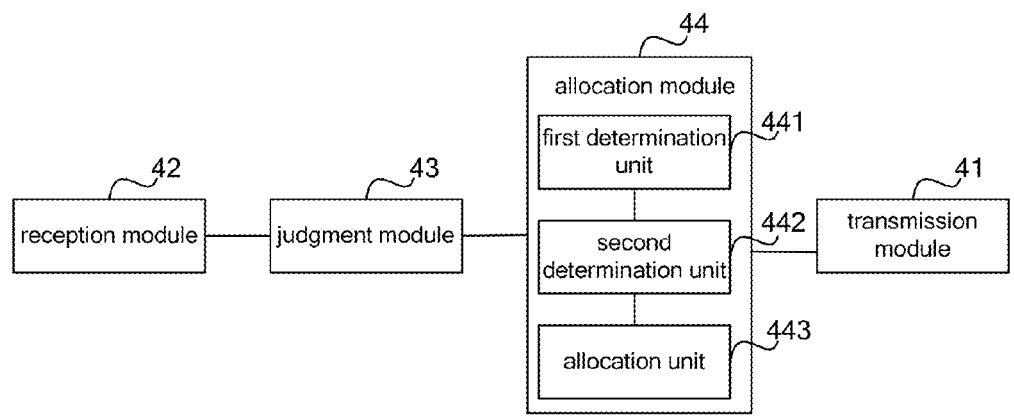
FIG. 4 is a schematic view showing a centralized node according to one embodiment of the present disclosure.

The present disclosure further provides in one embodiment a centralized node which, as shown in FIG. 4, includes a transmission module 41, a reception module 42, a judgment module 43 and an allocation module 44.

The transmission module 41 is configured to allocate a spectrum, and transmit a spectrum allocation result to each communication node, so that the communication node works on a spectrum resource corresponding to the communication node in accordance with the spectrum allocation result and counts communication quality measurement information about the communication node. The reception module 42 is configured to receive the communication quality measurement information reported by the communication node. The judgment module 43 is configured to determine whether or not it is required to trigger the spectrum re-allocation for the communication node in accordance with the communication quality measurement information about the communication node. The allocation module 44 is configured to re-allocate the spectrum for the communication node when the judgment module determines that it is required to trigger the spectrum re-allocation for the communication node.

In the embodiments of the present disclosure, the judgment module 43 is specifically configured to determine whether or not the communication quality measurement information about the communication node is greater than a predetermined quality threshold, and when the communication quality measurement information is not greater than the predetermined quality threshold, determine that it is required to trigger the spectrum re-allocation for the communication node.

In the embodiments of the present disclosure, the judgment module 43 is specifically configured to, when there are M pieces of communication quality measurement information about the communication node, determine a decision result $Q_1, Q_2, \ldots, Q_M$ representing the communication quality with respect to each piece of communication quality measurement information, and when $$\frac{1}{M} * \sum_{m=1}^{M} (W_m * Q_m)$$

is greater than a first predetermined threshold, determine that it is required to trigger the spectrum re-allocation for the communication code. Wm represents a weighted value for Qm.

In the embodiments of the present disclosure, the communication quality measurement information includes average throughput per resource unit counted by the communication node within a time period, a block error rate (BLER) for all users counted by the communication node within the time period, and an average interference measurement value counted by the communication node within the time period.

When the average throughput per resource unit within a time period is less than a second predetermined threshold, the corresponding decision result is a first mark for representing the bad communication quality. When the BLER for all the users within the time period is greater than a third predetermined threshold, the corresponding decision result is the first mark for representing the bad communication quality. When the average interference measurement value within the time period is greater than a fourth predetermined threshold, the corresponding decision result is the first mark for representing the bad communication quality.

In the embodiments of the present disclosure, the allocation module 44 includes a first determination unit 441, a second determination unit 442 and an allocation unit 443.

The first determination unit 441 is configured to determine the interference factor between the cells to which the communication nodes belong in accordance with the spectrum allocation result. The second determination unit 442 is configured to determine a communication node, the interference factor between which and a cell to which another communication node belongs is greater than a predetermined interference threshold, in accordance with the interference factors between the cells to which the communication nodes belong. The allocation unit 443 is configured to re-allocate the spectra for the communication node and the other communication node.

In the embodiments of the present disclosure, the first determination unit 441 is specifically configured to determine the interference factors between the cells to which the communication nodes belong in accordance with a combination of the spectrum allocation, the positions, the position heights, the radio environments, the transmission power, the system types and the out-of-band radiation templates of the communication nodes, or a combination of parts thereof.

In the embodiments of the present disclosure, at first, the first determination unit 441 is configured to calculate the power of a signal received by a UE in a cell to which a target communication node belongs from the cell to which the target communication node belongs using the following formula: $P_{received-i} = p_1 + G_{1i} - PL_{1i}$, wherein $p_1$ represents transmission power of the target communication node, $G_{1i}$ represents an antenna gain of the target communication node and a UE i, and $PL_{1i}$ represents a path loss between the base station equipment of the target communication node and the UE i in the cell to which the target communication node belongs and it is determined in accordance with the spectrum allocation, the positions, the position heights and the radio environments.

Then, the first determination unit 441 is configured to calculate power of an interference signal received by the UE in the cell to which the target communication node belongs from a cell to which an interference source communication node belongs using the following formula: $I_{received-i} = p_2 + G_{2i} - PL_{2i} - ACLR_{2i}$, wherein $P_2$ represents the transmission power of the interference source communication node, $G_{2i}$ represents an antenna gain of the interference source communication node and the UE i, $PL_{2i}$ represents the path loss between the base station equipment of the interference source communication node and the UE i in the cell to which the interference source communication node belongs, and $ACLR_{2i}$ represents an adjacent channel leakage ratio and it is determined in accordance with the out-of-band radiation template as well as an operating frequency interval between the cell to which the target communication node belongs and the cell to which the interference source communication node belongs.

Finally, the first determination unit 441 is configured to calculate the average carrier-to-interference ratio degradation level of the UE using the following formula and determine the average carrier-to-interference ratio degradation level as the interference factor between the cell to which the interference source communication node belongs and the cell to which the target communication node belongs:

$$CINR_{degradation} = \frac{1}{K}\sum_{i=1}^{K}\left(\frac{10^{\frac{P_{received-i}}{10}}}{N_0} - \frac{10^{\frac{P_{received-i}}{10}}}{N_0 + 10^{\frac{I_{received-i}}{10}}}\right),$$

wherein $N_0$ represents thermal noise power, and the UE i (i=1, ..., K) and the number K of the UEs are determined in accordance with the types of the cell to which the target communication node belongs and the cell to which the interference source communication node belongs.

In the embodiments of the present disclosure, at first, the first determination unit 441 is specifically configured to calculate power of a signal transmitted from an $i^{th}$ UE in the cell to which the interference source communication node belongs to the base station equipment in the cell to which the target communication node belongs using the following formula: $I_{received-i} = p_{2i} + G_{2i} - PL_{2i} - ACLR_{2i}$, wherein $p_2$ represents transmission power of the $i^{th}$ UE in the cell to which the interference source communication node belongs, $G_{2i}$ represents an antenna gain of the $i^{th}$ UE in the cell to which the interference source communication node belongs and the base station equipment in the cell to which the target communication node belongs, $PL_{2i}$ represents a path loss between the $i^{th}$ UE in the cell to which the interference source communication node belongs and the base station equipment in the cell to which the target communication node belongs and it is determined in accordance with the spectrum allocation, the positions, the position heights and the radio environments, and $ACLR_{2i}$ represents an adjacent channel leakage ratio and it is determined in accordance with the out-of-band radiation template and the operating frequency interval between the cell to which the target communication node belongs and the cell to which the interference source communication node belongs.

Then, the first determination unit 441 is configured to calculate the average signal power of the UE in the cell, to which the interference source communication node belongs, received by the base station equipment in the cell to which the target communication node belongs using the following formula, and determine the average signal power as the interference factor between the cell to which the interference source communication node belongs and the cell to which the target communication node belongs:

$$I = \frac{1}{K}\sum_{i=1}^{K}\left(10^{\frac{I_{received-i}}{10}}\right),$$

wherein the UE i (i=1, ..., K) and the number K of the UEs are determined in accordance with the types of the cell to which the target communication node belongs and the cell to which the interference source communication node belongs.

In the embodiments of the present disclosure, the modules in the centralized node may be integrated together, or deployed separately. In addition, the above modules may be formed integrally, or further divided into a plurality of submodules.

Figure 5:
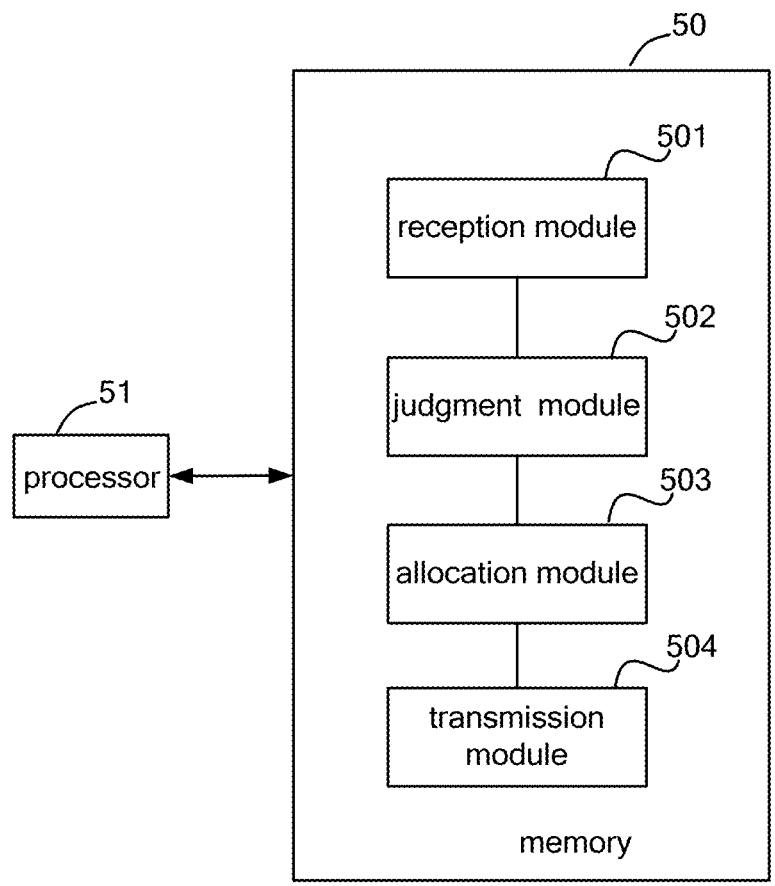
FIG. 5 is a schematic view showing a centralized node according to another embodiment of the present disclosure.

The present disclosure further provides in one embodiment a centralized node which, as shown in FIG. 5, includes a memory 50 and a processor 51. In an alternative embodiment of the present disclosure, the memory 50 may be a non-volatile computer-readable storage medium. Computer-readable instructions for implementing a transmission module 501, a reception module 502, a judgment module 503 and an allocation module 504 are stored in the memory 50, and these computer-readable instructions may be executed by the processor 51.

The transmission module 501 is configured to allocate a spectrum, and transmit a spectrum allocation result to each communication node, so that the communication node works on a spectrum resource corresponding to the communication node in accordance with the spectrum allocation result and counts communication quality measurement information about the communication node. The reception module 502 is configured to receive the communication quality measurement information reported by the communication node. The judgment module 503 is configured to determine whether or not it is required to trigger the spectrum re-allocation for the communication node in accordance with the communication quality measurement information about the communication node. The allocation module 504 is configured to re-allocate the spectrum for the communication node when the judgment module determines that it is required to trigger the spectrum re-allocation for the communication node.

In the embodiments of the present disclosure, the transmission module 501, the reception module 502, the judgment module 503 and the allocation module 504 may be further configured to achieve the other functions of the transmission module 41, the reception module 42, the judgment module 43 and the allocation module 44 in FIG. 4, which are not particularly defined herein.

Figure 6:
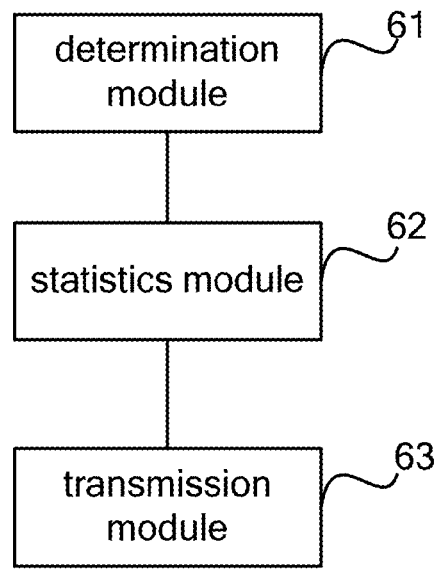
FIG. 6 is a schematic view showing a communication node according to one embodiment of the present disclosure.

The present disclosure further provides in one embodiment a communication node which, as shown in FIG. 6, includes a determination module 61, a counting module 62 and a transmission module 63.

The determination module 61 is configured to determine a spectrum allocation result so that the communication node works on a corresponding spectrum resource in accordance with the spectrum allocation result. The counting module 62 is configured to count communication quality measurement information about the communication node. The transmission module 63 is configured to transmit the communication quality measurement information to a centralized node so that the centralized node determines whether or not it is required to trigger the spectrum re-allocation in accordance with the communication quality measurement information about the communication node.

The communication quality measurement information includes one of the average throughput per resource unit counted by the counting module 62 within a time period, a BLER for all users counted by the counting module 62 within the time period, and an average interference measurement value counted by the counting module 62 within the time period.

When counting the average throughput per resource unit within a time period, the counting module 62 is specifically configured to, for the downlinks, divide the throughput for all the downlinks by the number of the occupied physical resources, and for the uplinks, divide the throughput for all the uplinks by the number of the occupied physical resources. The number of the physical resources includes the number of the occupied subcarriers or the number of the occupied code channels. When counting the BLER for all the users within a time period, the counting module 62 is specifically configured to, for the uplinks, count an error probability for blocks transmitted by all the users within a time window, and for the downlinks, divide the number of the NACKs for all the downlinks by a sum of the number of the ACKs for all the downlinks and the number of the NACKs for all the downlinks. When counting the average interference measurement value within a time period, the counting module 62 is specifically configured to, for a TD-SCDMA system, count an average value of the ISCP, and for a TD-LTE system, count an average value of 1/the RSRQ.

In the embodiments of the present disclosure, the modules in the communication node may be integrated together, or deployed separately. In addition, the above modules may be formed integrally, or further divided into a plurality of submodules.

Figure 7:
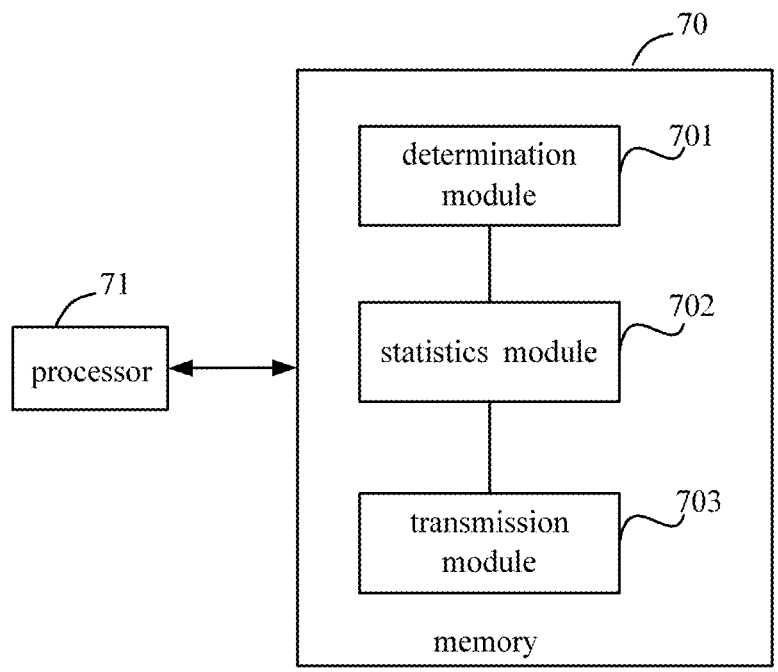
FIG. 7 is a schematic view showing a communication node according to another embodiment of the present disclosure.

The present disclosure further provides in one embodiment a centralized node which, as shown in FIG. 7, includes a memory 70 and a processor 71. In an alternative embodiment, the memory 70 may be a non-volatile computer-readable storage medium. Computer-readable instructions for implementing a determination module 701, a counting module 702 and a transmission module 703 are stored in the memory 70, and these computer-readable instructions may be executed by the processor 71.

The determination module 701 is configured to determine a spectrum allocation result so that a communication node operates on a corresponding spectrum resource in accordance with the spectrum allocation result. The counting module 702 is configured to count corresponding communication quality measurement information about the communication node. The transmission module 703 is configured to transmit the communication quality measurement information to the centralized node so that the centralized node determines whether or not it is required to trigger the spectrum re-allocation in accordance with the communication quality measurement information.

In the embodiments of the present disclosure, the determination module 701, the counting module 702 and the transmission module 703 may also be configured to achieve the other functions of the determination module 61, the counting module 62 and the transmission module 63 in FIG. 6, which are not particularly defined herein.

Through the above-mentioned description, it is apparent for a person skilled in the art that the present disclosure may be implemented by hardware, or by software as well as a necessary common hardware platform, and in many cases, the former may be adopted. Based on this understanding, the technical solutions of the present disclosure, or the contributions of the present disclosure to the related art, may appear in the form of software products, which may be stored in a storage medium and include several instructions so as to enable a computer equipment (personal computer, server or network equipment) to execute the method according to the embodiments of the present disclosure.

It should be appreciated that, the drawings merely relate to the preferred embodiments, and the modules or flows in the drawings are not always those necessary for the implementation of the present disclosure.

It should be further appreciated that, the modules may be arranged in the devices as described in the embodiments of the present disclosure or, after some changes, in one or more devices different from these embodiments. The modules may be combined into one module, or may be further divided into a plurality of submodules.

The methods and devices in the embodiments of the present disclosure may be implemented by hardware, computer-readable instructions, or a combination thereof. The computer-readable instructions may be stored in a computer-readable storage medium, such as hard disk, compact disk read-only memory (CD-ROM), digital video disk (DVD), floppy disk, optical disk, magnetic tape, random-access memory (RAM), read-only memory (ROM), or any other appropriate storage devices. Alternatively, at least parts of the computer-readable instructions may be replaced with hardware, e.g., customized integrated circuit, gate array, field programmable gate array (FPGA), programmable logic device (PLD), or computer having a corresponding function.

The present disclosure provides in the embodiments a computer-readable storage medium for storing the instructions so as to enable the computer to execute the mentioned method. To be specific, the systems or devices in the embodiments of the present disclosure each includes a storage medium for storing computer-readable program codes, so as to achieve the above-mentioned functions. In addition, these systems or devices (or a central processing unit (CPU) or micro processing unit (MPU) can read and execute the program codes stored in the storage medium.

In this case, the program codes read from the storage medium may be used to implement any one of the above-mentioned embodiments, so the program codes and the storage medium storing the program codes are parts of the technical solutions of the present disclosure.

The storage medium storing the program codes includes floppy disk, hard disk, magneto-optical disk, an optical disk (e.g., CD-ROM, compact disk-recordable (CD-R), compact disk-rewritable (CD-RW), DVD-ROM, DVD-RAM, DVD-RW, and DVD-RW), magnetic disk, flash card or ROM. Alternatively, the program codes may also be downloaded from a server through a communication network.

It should be appreciated that, at least a part of operations may be implemented by an operating system running on the computer on the basis of the computer-executable program codes, so as to implement the technical solutions in any one of the above-mentioned embodiments. The computer may execute the instructions based on the program codes.

In addition, the program codes in the storage medium may be written into the memory. The memory located in an extension board inserted into the computer, or in an extension unit connected to the computer. In the embodiments of the present disclosure, at least a part of the operations is executed, on the basis of the program codes, by a CPU in the extension board or extension unit in accordance with the instructions, so as to implement the technical solutions according to any one of the above-mentioned embodiments.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A dynamic spectrum allocation method, comprising steps of:
    allocating, by a centralized node, a spectrum, and transmitting a spectrum allocation result to a communication node, so that the communication node operates on a spectrum resource corresponding to the communication node in accordance with the spectrum allocation result and performs statistics of communication quality measurement information;
    receiving, by the centralized node, the communication quality measurement information reported by the communication node; and
    determining, by the centralized node, whether or not it is required to trigger the spectrum re-allocation for the communication node in accordance with the communication quality measurement information about the communication node, and when it is required to trigger the spectrum re-allocation for the communication node, re-allocating the spectrum for the communication node,
    wherein the step of determining, by the centralized node, whether or not it is required to trigger the spectrum re-allocation for the communication node in accordance with the communication quality measurement information about the communication node comprises:
        judging, by the centralized node, whether or not the communication quality measurement information about the communication node exceeds a predetermined quality threshold, and when the communication quality measurement information about the communication node does not exceed the predetermined quality threshold, determining that it is required to trigger the spectrum re-allocation for the communication node.

2. The method according to claim 1, wherein the step of, by the centralized node, whether or not it is required to trigger the spectrum re-allocation for the communication node in accordance with the communication quality measurement information about the communication node comprises:
    when there are M pieces of communication quality measurement information about the communication node, determining, by the centralized node, a decision result $Q_1, Q_2, \ldots, Q_M$ representing the communication quality with respect to each piece of communication quality measurement information, and when $$\frac{1}{M} * \sum_{m=1}^{M} (W_m * Q_m)$$

is greater than a first predetermined threshold, determining that it is required to trigger the spectrum re-allocation for the communication node, wherein Wm represents a weighted value for Qm.

3. The method according to claim 2, wherein the communication quality measurement information comprises average throughput per resource unit within a time period, a block error rate (BLER) for all users within the time period, and an average interference measurement value within the time period,
    wherein when the average throughput per resource unit within the time period is less than a second predetermined threshold, the decision result is a first mark for representing bad communication quality, when the BLER for all the users within the time period is greater than a third predetermined threshold, the decision result is the first mark for representing bad communication quality, and when the average interference measurement value within the time period is greater than a fourth predetermined threshold, the decision result is the first mark for representing bad communication quality.

4. The method according to claim 1, wherein the step of re-allocating, by the centralized node, the spectrum for the communication node comprises:
    determining, by the centralized node, interference factors between cells to which the communication node belongs in accordance with the spectrum allocation result;
    determining, by the centralized node, another communication node, the interference factor between which and the cell to which the communication node belongs is greater than the predetermined interference threshold in accordance with the interference factors between the cells to which the communication node belongs; and
    re-allocating, by the centralized node, the spectrum for the communication node and the other communication node.

5. The method according to claim 4, wherein the step of determining, by the centralized node, the interference factors between the cells to which the communication node belongs in accordance with the spectrum allocation result comprises:
  determining, by the centralized node, the interference factors between the cells to which the communication node belongs in accordance with a combination of all, or parts of, spectrum allocation, positions, position heights, radio environments, transmission power, system types, and out-of-band radiation templates of the communication node.

6. The method according to claim 5, wherein
  the step of determining, by the centralized node, the interference factors between the cells to which the communication node belongs in accordance with the spectrum allocation result comprises:
    calculating, by the centralized node, power of a signal received from a cell to which a target communication node belongs by a user equipment (UE) in the cell to which the target communication node belongs using the following formula: $P_{received-i} = p_1 + G_{1i} - PL_{1i}$, wherein $p_1$ represents transmission power of the target communication node, $G_{1i}$ represents an antenna gain of the target communication node and a UE i, and $PL_{1i}$ represents a path loss between a base station equipment of the target communication node and the UE i in the cell to which the target communication node belongs and it is determined in accordance with the spectrum allocation, the positions, the position heights and the radio environments;
    calculating, by the centralized node, an interference signal received by the UE from a cell to which an interference source communication node belongs using the following formula: $I_{received-i} = p_2 + G_{2i} - PL_{2i} - ACLR_{2i}$, wherein $p_2$ represents transmission power of the interference source communication node, $G_{2i}$ represents an antenna gain of the interference source communication node and the UE i, $PL_{2i}$ represents a path loss between the base station equipment of the interference source communication node and the UE i in the cell to which the interference source communication node belongs, and $ACLR_{2i}$ represents an adjacent channel leakage ratio and it is determined in accordance with the out-of-band radiation templates as well as an operating frequency interval between the cell to which the target communication node belongs and the cell to which the interference source communication node belongs; and
    calculating, by the centralized node, an average carrier-to-interference ratio degradation level for the UE using the following formula, and determining the average carrier-to-interference ratio degradation level for the UE as the interference factor between the cell to which the interference source communication node belongs and the cell to which the target communication node belongs:

$$CINR_{degradation} = \frac{1}{K}\sum_{i=1}^{K}\left(10^{\frac{P_{received-i}}{10}}\cdot\frac{1}{N_0} - \frac{10^{\frac{P_{received-i}}{10}}}{N_0 + 10^{\frac{I_{received-i}}{10}}}\right),$$

wherein $N_0$ represents thermal noise power, and the UE i (i=1, . . . , K) and the number K of the UEs are determined in accordance with the types of the cell to which the target communication node belongs and the cell to which the interference source communication node belongs; or
  the step of determining, by the centralized node, the interference factors between the cells to which the communication nodes belong in accordance with the spectrum allocation result comprises:
    calculating, by the centralized node, power of a signal transmitted from an $i^{th}$ UE in the cell to which the interference source communication node belongs to a base station equipment in the cell to which the target communication node belongs using the following formula: $I_{received-i} = p_{2i} + G_{2i} - PL_{2i} - ACLR_{2i}$, wherein $p_2$ represents transmission power of the $i^{th}$ UE in the cell to which the interference source communication node belongs, $G_{2i}$ represents an antenna gain of the $i^{th}$ UE in the cell to which the interference source communication node belongs and the base station equipment in the cell to which the target communication node belongs, $PL_{2i}$ represents a path loss between the $i^{th}$ UE in the cell to which the interference source communication node belongs and the base station equipment in the cell to which the target communication node belongs and it is determined in accordance with the spectrum allocation, the positions, the position heights and the radio environments, and $ACLR_{2i}$ represents an adjacent channel leakage ratio and it is determined in accordance with the out-of-band radiation templates and the operating frequency interval between the cell to which the target communication node belongs and the cell to which the interference source communication node belongs; and
    calculating, by the centralized node, average signal power of the UE in the cell, to which the interference source communication node belongs, received by the base station equipment in the cell to which the target communication node belongs using the following formula, and determining the average signal power of the UE in the cell to which the interference source communication node belongs as the interference factor between the cell to which the interference source communication node belongs and the cell to which the target communication node belongs:

$$I = \frac{1}{K}\sum_{i=1}^{K}\left(10^{\frac{I_{received-i}}{10}}\right),$$

wherein the UE i (i=1, . . . , K) and the number K of the UEs are determined in accordance with the types of the cell to which the target communication node belongs and the cell to which the interference source communication node belongs.

7. A dynamic spectrum allocation method, comprising steps of:
  determining, by a communication node, a spectrum allocation result, so that the communication node operates on a corresponding spectrum resource in accordance with the spectrum allocation result;
  performing, by the communication code, statistics of communication quality measurement information about the communication node; and
  transmitting, by the communication node, the communication quality measurement information to a centralized node so that the centralized node determines whether or not it is required to trigger the spectrum re-allocation in accordance with the communication quality measurement information about the communication node, wherein the communication quality measurement information comprises one of average throughput per resource unit within a time period, a block error rate (BLER) for all users within the time period, and an average interference measurement value within the time period, or a combination thereof.

8. The method according to claim 7, wherein the step of performing, by the communication node, statistics of the communication quality measurement information about the communication node comprises:

when counting the average throughput per resource unit within a time period, for downlinks, counting, by the communication node, the average throughput per resource unit by dividing the throughput for all the downlinks by the number of occupied physical resources, and for uplinks, counting the average throughput per resource unit by dividing the throughput for all the uplinks by the number of occupied physical resources, wherein the number of the occupied physical resources is the number of occupied subcarriers or the number of occupied code channels;

when counting the BLER for all the users within a time period, for the uplinks, counting an error probability for blocks transmitted by all the users within a time window as the BLER for all the users, and for downlinks, counting the BLER for all the users by dividing the number of Negative Acknowledgements (NACKs) for all the downlinks divided by a sum of the number of the Acknowledgements (ACKs) for all the downlinks and the number of the NACKs for all the downlinks; and when counting the average interference measurement value within a time period, for a Time Division-Synchronous Code Division Multiple Access (TD-SCDMA) system, counting an average value of Interference Signal Code Power (ISCP) as the average interference measurement value, and for a Time Division-Long Term Evolution (TD-LTE) system, counting an average value of 1/Reference Signal Received Quality (RSRQ) as the average interference measurement value.

9. A centralized node, comprising a processor and a memory storing instructions to be executed by the processor, wherein the processor is configured to:

allocate a spectrum, and transmit a spectrum allocation result to the communication node, so that the communication node operates on a spectrum resource corresponding to the communication node in accordance with the spectrum allocation result and performs statistics of communication quality measurement information about the communication node;

receive the communication quality measurement information reported by the communication node;

judge whether or not it is required to trigger the spectrum re-allocation for the communication node in accordance with the communication quality measurement information about the communication node; and re-allocate the spectrum for the communication node when the judgment module judges that it is required to trigger the spectrum re-allocation for the communication node, wherein the processor is configured to judge whether or not the communication quality measurement information about the communication node exceeds a predetermined quality threshold, and when the communication quality measurement information does not exceed the predetermined quality threshold, determine that it is required to trigger the spectrum re-allocation for the communication node.

10. The centralized node according to claim 9, wherein the processor is configured to, when there are M pieces of communication quality measurement information about the communication node, determine a decision result $Q_1, Q_2, \ldots, Q_M$ representing the communication quality with respect to each piece of communication quality measurement information, and when $$\frac{1}{M} * \sum_{m=1}^{M} (W_m * Q_m)$$

is greater than a first predetermined threshold, determine that it is required to trigger the spectrum re-allocation for the communication code, wherein Wm represents a weighted value for Qm.

11. The centralized node according to claim 10, wherein the communication quality measurement information comprises average throughput per resource unit within a time period, a block error rate (BLER) for all users within the time period, and an average interference measurement value within the time period;

when the average throughput per resource unit within the time period is less than a second predetermined threshold, the corresponding decision result is a first mark for representing bad communication quality;

when the BLER for all the users within the time period is greater than a third predetermined threshold, the corresponding decision result is the first mark for representing bad communication quality; and when the average interference measurement value within the time period is greater than a fourth predetermined threshold, the corresponding decision result is the first mark for representing bad communication quality.

12. The centralized node according to claim 9, wherein the processor is configured to:

determine interference factors between the cells to which the communication node belongs in accordance with the spectrum allocation result;

determine another communication node, the interference factor between which and a cell to which the communication node belongs is greater than a predetermined interference threshold, in accordance with the interference factors between the cells to which the communication nodes belong; and re-allocate the spectra for the communication node and the other communication node.

13. The centralized node according to claim 12, wherein the processor is configured to determine the interference factors between the cells to which the communication node belongs in accordance with a combination of all, or parts of, spectrum allocation, positions, position heights, the radio environments, transmission power, system types and out-of-band radiation templates of the communication node.

14. The centralized node according to claim 13, wherein the processor is configured to:

calculate power of a signal received by a user equipment (UE) in a cell to which a target communication node belongs from the cell to which the target communication node belongs using the following formula: $P_{received-i}=p_1+G_{1i}-PL_{1i}$, wherein $p_1$ represents transmission power of the target communication node, $G_{1i}$ represents an antenna gain of the target communication node and a UE i, and $PL_{1i}$ represents a path loss between a base station equipment of the target communication node and the UE i in the cell to which the target communication node belongs and it is determined in accordance with the spectrum allocation, the positions, the position heights and the radio environments;

calculate power of an interference signal received by the UE in the cell to which the target communication node belongs from a cell to which an interference source communication node belongs using the following formula: $I_{received-i}=p_2+G_{2i}-PL_{2i}-ACLR_{2i}$, wherein $p_2$ represents the transmission power of the interference source communication node, $G_{2i}$ represents an antenna gain of the interference source communication node and the UE i, $PL_{2i}$ represents the path loss between the base station equipment of the interference source communication node and the UE i in the cell to which the interference source communication node belongs, and $ACLR_{2i}$ represents an adjacent channel leakage ratio and it is determined in accordance with the out-of-band radiation template as well as an operating frequency interval between the cell to which the target communication node belongs and the cell to which the interference source communication node belongs; and calculate an average carrier-to-interference ratio degradation level of the UE using the following formula and determine the average carrier-to-interference ratio degradation level as the interference factor between the cell to which the interference source communication node belongs and the cell to which the target communication node belongs:

$$CINR_{degradation} = \frac{1}{K}\sum_{i=1}^{K}\left(10^{\frac{P_{received-i}}{10}}\frac{}{N_0} - \frac{10^{\frac{P_{received-i}}{10}}}{N_0 + 10^{\frac{I_{received-i}}{10}}}\right),$$

wherein $N_0$ represents thermal noise power, and the UE i (i=1, ..., K) and the number K of the UEs are determined in accordance with the types of the cell to which the target communication node belongs and the cell to which the interference source communication node belongs; or the processor is configured to:
calculate power of a signal transmitted from an $i^{th}$ UE in the cell to which the interference source communication node belongs to the base station equipment in the cell to which the target communication node belongs using the following formula: $I_{received-i}=p_{2i}+G_{2i}-PL_{2i}-ACLR_{2i}$, wherein $p_2$ represents transmission power of the $i^{th}$ UE in the cell to which the interference source communication node belongs, $G_{2i}$ represents an antenna gain of the $i^{th}$ UE in the cell to which the interference source communication node belongs and the base station equipment in the cell to which the target communication node belongs, $PL_{2i}$ represents a path loss between the $i^{th}$ UE in the cell to which the interference source communication node belongs and the base station equipment in the cell to which the target communication node belongs and it is determined in accordance with the spectrum allocation, the positions, the position heights and the radio environments, and $ACLR_{2i}$ represents an adjacent channel leakage ratio and it is determined in accordance with the out-of-band radiation template and the operating frequency interval between the cell to which the target communication node belongs and the cell to which the interference source communication node belongs; and calculate average signal power of the UE in the cell, to which the interference source communication node belongs, received by the base station equipment in the cell to which the target communication node belongs using the following formula, and determine the average signal power as the interference factor between the cell to which the interference source communication node belongs and the cell to which the target communication node belongs:

$$I = \frac{1}{K}\sum_{i=1}^{K}\left(10^{\frac{I_{received-i}}{10}}\right),$$

wherein the UE i (i=1, ..., K) and the number K of the UEs are determined in accordance with the types of the cell to which the target communication node belongs and the cell to which the interference source communication node belongs.

15. A communication node, comprising a processor and a memory storing instructions to be executed by the processor, wherein the processor is configured to:
determine a spectrum allocation result so that the communication node operates on a corresponding spectrum resource in accordance with the spectrum allocation result;
perform statistics of communication quality measurement information about the communication node; and
transmit the communication quality measurement information to a centralized node so that the centralized node determines whether or not it is required to trigger the spectrum re-allocation in accordance with the communication quality measurement information about the communication node,
wherein the communication quality measurement information comprises one of average throughput per resource unit within a time period, a block error rate (BLER) for all users within the time period, and an average interference measurement value within the time period, or a combination thereof.

16. The communication node according to claim 15, wherein the processor is configured to:
when counting the average throughput per resource unit within a time period, for downlinks, count the average throughput per resource unit by dividing the throughput for all the downlinks by the number of occupied physical resources, and for uplinks, count the average throughput per resource unit by dividing the throughput for all the uplinks by the number of occupied physical resources, wherein the number of the occupied physical resources is the number of occupied subcarriers or the number of occupied code channels;
when counting the BLER for all the users within a time period, for the uplinks, count an error probability for blocks transmitted by all the users within a time window as the BLER for all the users, and for downlinks, count the BLER for all the users by dividing the number of Negative Acknowledgements (NACKs) for all the downlinks divided by a sum of the number of the Acknowledgements (ACKs) for all the downlinks and the number of the NACKs for all the downlinks; and when counting the average interference measurement value within a time period, for a Time Division-Synchronous Code Division Multiple Access (TD-SCDMA) system, count an average value of Interference Signal Code Power (ISCP) as the average interference measurement value, and for a Time Division-Long Term Evolution (TD-LTE) system, count an average value of 1/Reference Signal Received Quality (RSRQ) as the average interference measurement value.

* * * * *